United States Patent
Nagata et al.

[15] 3,641,315
[45] Feb. 8, 1972

[54] SYSTEM FOR AUTOMATICALLY CONDUCTING OFFICE WORK REQUIRED FOR TRANSACTIONS AT A BANK AND THE LIKE

[72] Inventors: Masanori Nagata, Kyoto; Masato Mori, Osaka, both of Japan

[73] Assignee: Omron Tateisi Electronics Co., Kyoto, Japan

[22] Filed: Feb. 27, 1970

[21] Appl. No.: 14,919

[30] Foreign Application Priority Data

Mar. 4, 1969 Japan..................................44/17029

[52] U.S. Cl....................235/61.7 B, 194/4 F, 340/149 A
[51] Int. Cl.....................H04q 5/02, G07f 1/06, G06k 15/18
[58] Field of Search................235/61.114, 61.11, 61.7; 340/149 A; 346/42; 194/DIG. 6, 4 F

[56] References Cited

UNITED STATES PATENTS

| | | | |
|---|---|---|---|
| 3,394,246 | 7/1968 | Goldman | 235/61.7 |
| 3,221,304 | 11/1965 | Enikeieff | 340/149 |
| 3,430,200 | 2/1969 | Barney | 340/149 |
| 3,212,615 | 10/1965 | Heller | 235/61.12 |
| 3,356,021 | 12/1967 | May | 101/93 |
| 3,355,576 | 11/1967 | Childers | 235/61.7 |
| 3,419,881 | 12/1968 | Yamamoto | 346/42 |

*Primary Examiner*—Thomas A. Robinson
*Assistant Examiner*—Robert M. Kilgore
*Attorney*—Christensen, Sanborn and Matthews

[57] ABSTRACT

A system for automatically conducting office work required for transactions at a bank and the like establishments. In accordance with the system, the bank previously issues to each customer a card on which a predetermined information including a secret number is recorded, and at the same time gives to each said customer a memory number which has a predetermined relation to said secret number. The system comprises means for reading the information of a card presented by a customer for a transaction with the bank; means for storing a memory number presented by said customer; means for comparing said secret number and memory number to produce a control signal when said predetermined relation exists between said two numbers; means for providing a new information resulting from said transaction; and a computer controlled by said control signal to store said information read from said card and at the same time select from the contents already stored therein an information required for said transaction with said customer, said last-named information to be exchanged for said new information.

2 Claims, 1 Drawing Figure

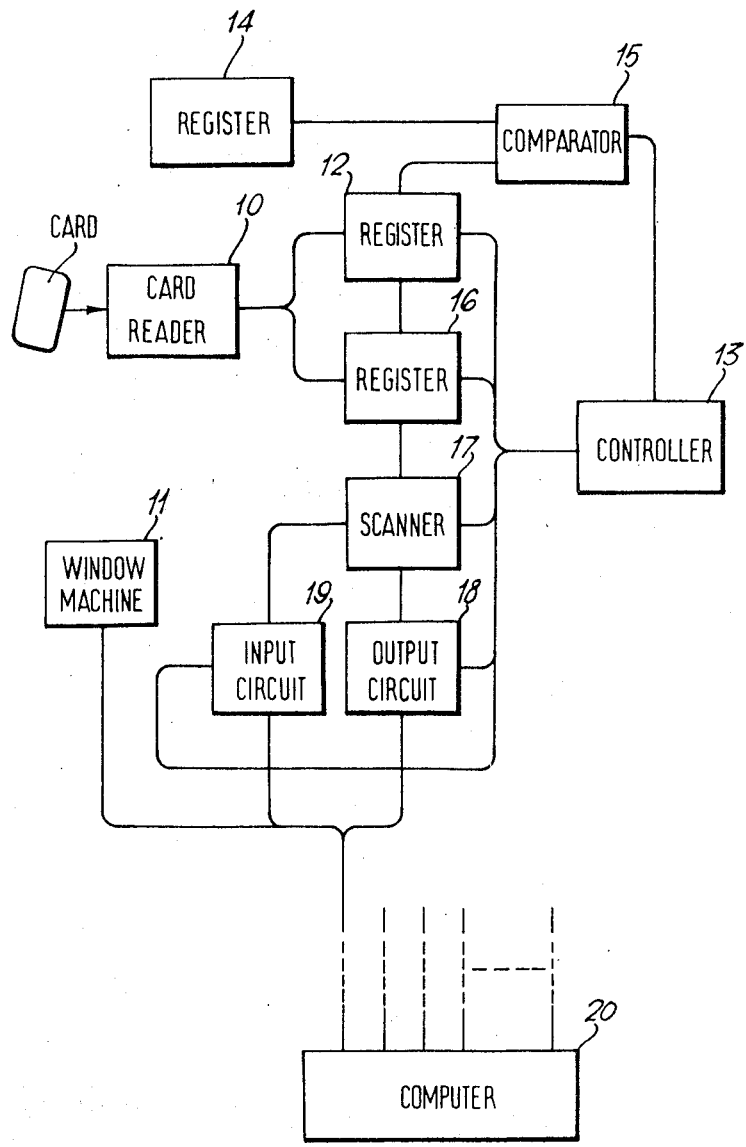

SYSTEM FOR AUTOMATICALLY CONDUCTING OFFICE WORK REQUIRED FOR TRANSACTIONS AT A BANK AND THE LIKE

This invention relates to a system for automatically conducting office work required for transactions at a bank and the like establishments.

In recent years electronic computers are coming into wide use in many banks in order to increase the accuracy and speed in performing clerical work involved in various transactions, especially those at the teller's window or counter, thereby giving customers better services. Despite the introduction of a computer system into the banking business, there are some problems yet to be solved. Usually, for transactions with a bank, say, a deposit withdrawal, the customer is required to present to the bank his or her seal or signature, which is collated with the customer's seal or signature previously known to the bank for identification purposes. These will be little or no problem if deposit withdrawals are restricted to a particular office of the bank. The recent trend in the field of business is such that customers are free to make withdrawals at any of the branch offices of the bank or other banks associated therewith. In such a case, the material or data for collation of the signatures or seals of all the customers must be provided at all the offices of the bank where withdrawals are to be made. The cost involved is very high.

Accordingly, it is one object of the invention to provide a system which simplifies the office work required for transactions at a bank and the like establishments, especially those at the teller's window or counter.

Another object of the invention is to provide a system which enables performance of office work required for transactions at the teler's window or counter without the necessity for any seal or signature to be presented by the customer and for any actions to be taken by the teller for identification of the customer's seal or signature, and consequently without any need for providing any material or data therefor.

In accordance with the system of the invention, identification cards are used instead of seals or signatures. Each and every customer is given an identification card which has recorded thereon a secret number as well as other necessary information. In addition to the secret number on the card, a different number having a predetermined relation to the secret number is known to the proper owner of the card beforehand. This number will be referred to as the memory number. When a card is used at the counter or window of the bank, the user of the card presents a memory number to the teller, and the secret number a card reader has read from the card is collated with the memory number. Only when a predetermined relation exists between the two numbers, the user is recognized as the proper owner of the card, so that a computer in the system controls a suitable window machine at the teller's window to perform necessary work for the transaction. Thus, the only requirement is to compare the secret number read by the card reader and the memory number presented by the customer to check if there exists a predetermined relation between the two numbers. Compared with the conventional system which requires the material or data necessary for collation of signatures or seals provided at all offices of the bank, the system of the invention greatly simplifies the clerical work at the window or counter, and consequently increases the accuracy and speed of handling various banking transactions.

The invention will be better understood from the following description of a preferred embodiment thereof with reference to the accompanying drawing, wherein the single FIGURE is an electrical block diagram of the system of the invention.

The bank previously issues to each and every customer an identification card on which necessary information such as the customer's account number, the of number, etc., as well as a secret number are written by any suitable method, say, magnetic recording. Besides the identification card, each customer is given a memory number which has a predetermined relation to the secret number of the identification card.

When a customer introduces his or her card C into a card reader 10, or a bank teller receives the card from the customer and puts it into the card reader, the card reader reads the information of the card including the secret number. The secret number is stored in a register 12 which is controlled by a controller 13. On the other hand, the customer puts his or her memory number into a register 14 having a dial or keyboard, or the bank teller puts into the register the memory number presented by the customer. A comparator 15 compares the secret number stored in the register 12 and the memory number stored in the register 14. If the predetermined relation exists between the two numbers, the comparator 15 recognizes the customer as the proper owner of the card and produces a corresponding signal to be applied to the controller 13. If the predetermined relation does not exist between the two numbers, the customer is recognized as an improper holder of the card. A suitable device may be provided to give a warning in response to this recognition.

In response to the above-mentioned signal from the comparator 15, the controller 13 operates a register 16, which stores the other information of the card, that is, the account number, the office number, etc., the card reader 10 has read from the card C. Upon completion of this storing operation, the register 16 produces a completion signal to be applied to the controller 13. In response to this completion signal, the controller 13 operates a scanner 17, an output circuit 18 and an input circuit 19. Under the control of the input circuit 19 which is in turn controlled by a computer 20, the scanner 17 successively takes out from the register 16 the informations stored therein and sent them onto the computer 20 through the output circuit 18. The computer stores the informations received and selects from the informations already stored therein an information corresponding to the information received from said register 16, such as, for example, the deposit amount of the customer's account. On the basis of this selected information, a suitable window machine 11 such as an accounting machine at the teller's counter operated by a teller conducts exchange of informations required for the transaction, while the teller receives bills, checks or other instruments from the customer and gives him a receipt or something, or hand cash to him.

The computer 20 may be installed at a main office of a bank, with suitable connections to the other component parts of the system provided at each of the branch offices of the bank or some other associated banks.

Thus, in accordance with the invention, in order to identify the customer who comes to the counter of the bank for transactions, it is not necessary to check whether the seal or signature he or she has presented to the bank is true and genuine, so that the teller's work at the counter is much simplified and the accuracy of execution of the work is increased. Furthermore, a computer can be introduced into the system of the invention without any substantial difficulty, so that the speed of the clerical work at the counter is much increased thereby to give customers better services. If the account number of each customer is written on the card, it can be automatically read by the card reader provided in the system to the great convenience of the bank teller.

What we claim is:

1. A system for automatically conducting the office work required for transactions at a bank, wherein said bank previously issues to each customer a card on which a predetermined information including an account number is recorded, and at the same time gives to each customer a memory number which has a predetermined relation to said account number, said system comprising:
   a. means for reading the information on a card presented by a customer for a transaction with the bank,
   b. means for storing a memory number presented by said customer,
   c. means for comparing an account number obtained from the information that has been read from the card and said memory number to produce a control signal when said predetermined relation exists between said two numbers, d. a window machine for providing information relating to a desired deposit or withdrawal in said account, and a computer actuated by said control signal to store said account information obtained from the information read from said card and said deposit or withdrawal information entered through said window machine, said computer comparing said deposit or withdrawal information with the balance of said account stored therein, said computer further providing a new balance of said account to said window machine for reporting to said customer.

2. A system as recited in claim 1, wherein said bank has a plurality of offices, each having installed therein said reading means, said storing means, said comparing means and said window machine, wherein said computer is installed in one of said offices so as to be selectively connectable to said comparing means and said window machine in each of said offices.

* * * * *